US011362993B2

(12) United States Patent
Das (10) Patent No.: US 11,362,993 B2
(45) Date of Patent: Jun. 14, 2022

(54) METHOD AND SYSTEM FOR SECURING DATA TRANSMISSION IN COMMUNICATION NETWORKS

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 286 days.

(21) Appl. No.: 16/822,278

(22) Filed: Mar. 18, 2020

(65) Prior Publication Data

US 2021/0288941 A1  Sep. 16, 2021

(30) Foreign Application Priority Data

Mar. 16, 2020 (IN) .............................. 202041011337

(51) Int. Cl.
  *H04L 29/06* (2006.01)
  *H04L 9/40* (2022.01)
  *H04L 47/34* (2022.01)
  *H04L 45/74* (2022.01)

(52) U.S. Cl.
  CPC .......... *H04L 63/0236* (2013.01); *H04L 45/74* (2013.01); *H04L 47/34* (2013.01); *H04L 63/04* (2013.01)

(58) Field of Classification Search
  CPC ..... H04L 63/0236; H04L 45/74; H04L 47/34; H04L 63/04
  USPC .......................................................... 726/13
  See application file for complete search history.

(56) References Cited

U.S. PATENT DOCUMENTS

| 8,112,471 B2 * | 2/2012 | Wei ..................... H04L 67/1008 709/224 |
| 8,615,785 B2 | 12/2013 | Elrod et al. |
| 2013/0239182 A1 | 9/2013 | Pierson et al. |
| 2015/0067819 A1 * | 3/2015 | Shribman ............... H04L 67/06 709/218 |
| 2015/0073967 A1 * | 3/2015 | Katsuyama ............. H04L 47/12 705/37 |

FOREIGN PATENT DOCUMENTS

CN            104521196 B       6/2017

\* cited by examiner

*Primary Examiner* — Evans Desrosiers
(74) *Attorney, Agent, or Firm* — Finnegan, Henderson, Farabow, Garrett & Dunner, LLP (57) ABSTRACT

A method and system for securing data transmission in communication networks is disclosed. The method includes the steps of allocating a sequence ID (SQID) to each of a plurality of packets. The SQID is embedded in an Internet Protocol (IP) header of an associated packet from the plurality of packets. The method further includes grouping the plurality of packets into at least one cluster based on at least one of a distance amongst at least one IP attribute associated with destination address of each of the plurality of packets and variance in IP attributes associated with destination address of each of the plurality of packets. The method includes transmitting each of the at least one cluster to an associated destination address. Each cluster in the at least one cluster includes a set of packets from the plurality of packets and at least a domain-name is same in destination address.

19 Claims, 9 Drawing Sheets

METHOD AND SYSTEM FOR SECURING DATA TRANSMISSION IN COMMUNICATION NETWORKS

TECHNICAL FIELD

The present invention relates to communication networks. In particular, the present invention relates to a method and system for securing data transmission in communication networks.

BACKGROUND

Communication networks are medium for data propagation from one device and/or cloud/datacenter to another device and/or cloud/datacenter. However, communication networks experience issues in data propagation that may be related to network security and may include physical network security, technical network security, and administrative network security. Network security usually depends upon data sources, data handling units, and residing units. Hence, there is still a need to develop a system and method to provide complete network security. Additionally, the communication networks require improvement in terms of transmission latency, jitter rate, or the like. When data being transmitted is large, data handling becomes difficult and is prone to errors.

Today, various hacking methodologies are employed for stealing data even from a secured network. Thus, data handling becomes more important than securing the communication network. Data handling and packet security in communication networks, that are transacted manually without being noticed or in an uncontrollable manner, may include various problems such as a server-less application vulnerability, Internet-of-Things (IoT) based data threats, Artificial Intelligence (AI) empowered attacks, and data leakage during the data handling.

In conventional methods, attackers may fetch an opportunity during handling part of the data. The conventional methods do not provide the data security during transmission of the data among multiple devices and they consider only a source and a destination for the network security. Additionally, the conventional methods do not solve the problem of packets vulnerability post determining the destination and the source. Therefore, these conventional methods do not add security to the packets during the transmission, as all the attackers usually target the data comprising packets from registered devices or mimic them with an advantage of virtualization.

SUMMARY

In one embodiment, a method for securing data transmission in communication networks is disclosed. In one embodiment, the method may include allocating a sequence ID (SQID) to each of a plurality of packets based on sequence associated with each of the plurality of packets. The SQID may be embedded in an Internet Protocol (IP) header of an associated packet from the plurality of packets The method may further include grouping the plurality of packets into at least one cluster based on at least one of a distance amongst at least one IP attribute associated with destination address of each of the plurality of packets, and variance in IP attributes associated with destination address of each of the plurality of packets. The method may further include transmitting each of the at least one cluster to an associated destination address. It should be noted that each cluster in the at least one cluster may comprise a set of packets from the plurality of packets, and at least a domain-name may be same in destination address associated with each of the set of packets.

In yet another embodiment, a system for securing data transmission in communication networks is disclosed. The system includes a processor and a memory communicatively coupled to the processor, wherein the memory stores processor instructions, which, on execution, causes the processor to allocate a sequence ID (SQID) to each of a plurality of packets based on sequence associated with each of the plurality of packets. The SQID may be embedded in an Internet Protocol (IP) header of an associated packet from the plurality of packets. The processor instructions further cause the processor to group the plurality of packets into at least one cluster based on at least one of a distance amongst at least one IP attribute associated with destination address of each of the plurality of packets, and variance in IP attributes associated with destination address of each of the plurality of packets. The processor instructions further cause the processor to transmit each of the at least one cluster to an associated destination address. It should be noted that each cluster in the at least one cluster may comprise a set of packets from the plurality of packets, and at least a domain-name may be same in destination address associated with each of the set of packets.

In yet another embodiment, a non-transitory computer-readable medium storing computer-executable instruction for securing data transmission in communication networks is disclosed. In one example, the stored instructions, when executed by a processor, may cause the processor to perform operations including allocating a sequence ID (SQID) to each of a plurality of packets based on sequence associated with each of the plurality of packets. The SQID may be embedded in an Internet Protocol (IP) header of an associated packet from the plurality of packets The operations may further include grouping the plurality of packets into at least one cluster based on at least one of a distance amongst at least one IP attribute associated with destination address of each of the plurality of packets, and variance in IP attributes associated with destination address of each of the plurality of packets. The operations may further include transmitting each of the at least one cluster to an associated destination address. It should be noted that each cluster in the at least one cluster may comprise a set of packets from the plurality of packets, and at least a domain-name may be same in destination address associated with each of the set of packets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
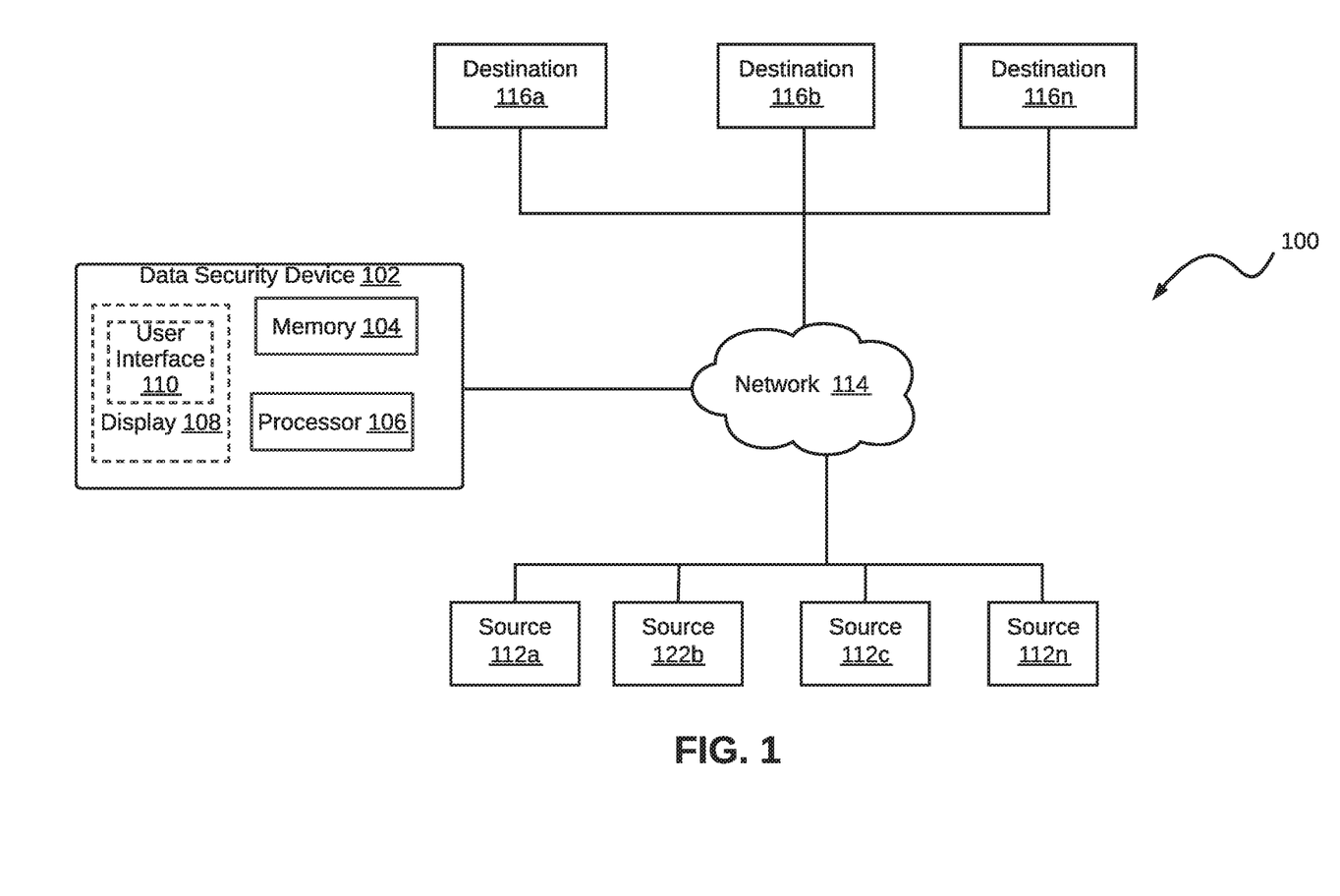
FIG. 1 is a block diagram of a system for securing data transmission in communication networks, in accordance with an embodiment.

In one embodiment, a system 100 for securing data transmission in communication networks is illustrated in the FIG. 1. In an embodiment, the system 100 may be used to resolve a problem of data hacking by tracking packets independent of a source and a destination, using a data security device 102. The data security device 102 tracks attacked or lost packets that move towards wrong destinations, proactively rather than reactively, thereby the data security device 102 generates a secured data. Examples of the data security device 102 may include, but are not limited to, a server, a desktop, a laptop, a notebook, a netbook, a tablet, a smartphone, a mobile phone, an application server, or the like.

The data security device 102 may include a memory 104, a processor 106, and a display 108. The data security device 102 provides details of a pathway to an administrator intending to control vulnerability after tracking the attacked packets. The details may include a packet speed, a location, domain details, Internet protocol (IP) details, subnet, and a Media Access Control (MAC) address associated with the attacked packets. The memory 104 and the processor 106 of the data security device 102 may perform various functions including allocation of sequence IDs (SQID), determination of category IDs, packet encapsulation, a data transmission, and identification of deviated packets. The memory 104 may store instructions that, when executed by the processor 106, cause the processor 106 to transmit a cluster of packets and track the attacked packets of the cluster during the data transmission in a particular way. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The display 108 may further include a user interface 110. A user or the administrator may interact with the data security device 102 and vice versa through the display 108. By way of an example, the display 108 may be used to display results of analysis performed by the data security device 102, to the user. By way of another example, the user interface 110 may be used by the user to provide inputs to the data security device 102.

As will be described in greater detail in conjunction with FIG. 2 to FIG. 9, in order to secure the data transmission, the data security device 102 may extract a data from one or more of a plurality of sources 112 (which may include sources 112a, 112b, 112c to 112n). Examples of the plurality of sources 112 may include, but are not limited to a desktop, a laptop, a notebook, a netbook, a tablet, a smartphone, a remote server, a mobile phone, or another computing system/device. The plurality of sources 112 may be communicatively coupled to the data security device 102, via a network 114. The network 114 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Once the data is received, the data security device 102 may encapsulate a plurality of packets, associated with the received data, into a cluster for the data transmission after allocating a category ID, an SQID, a cluster ID to each of the plurality of packets. Thereafter, the data security device 102 may share the cluster with one or more of a plurality of destinations 116 (for example, destinations 116a, 116b, and/or 116n). The data security device 102 may be operatively coupled to the plurality of destinations 116 via the network 114. Examples of the plurality of destinations 116 may include, but are not limited to a desktop, a laptop, a notebook, a netbook, a tablet, a smartphone, a remote server, a mobile phone, or another computing system/device.

Figure 2:
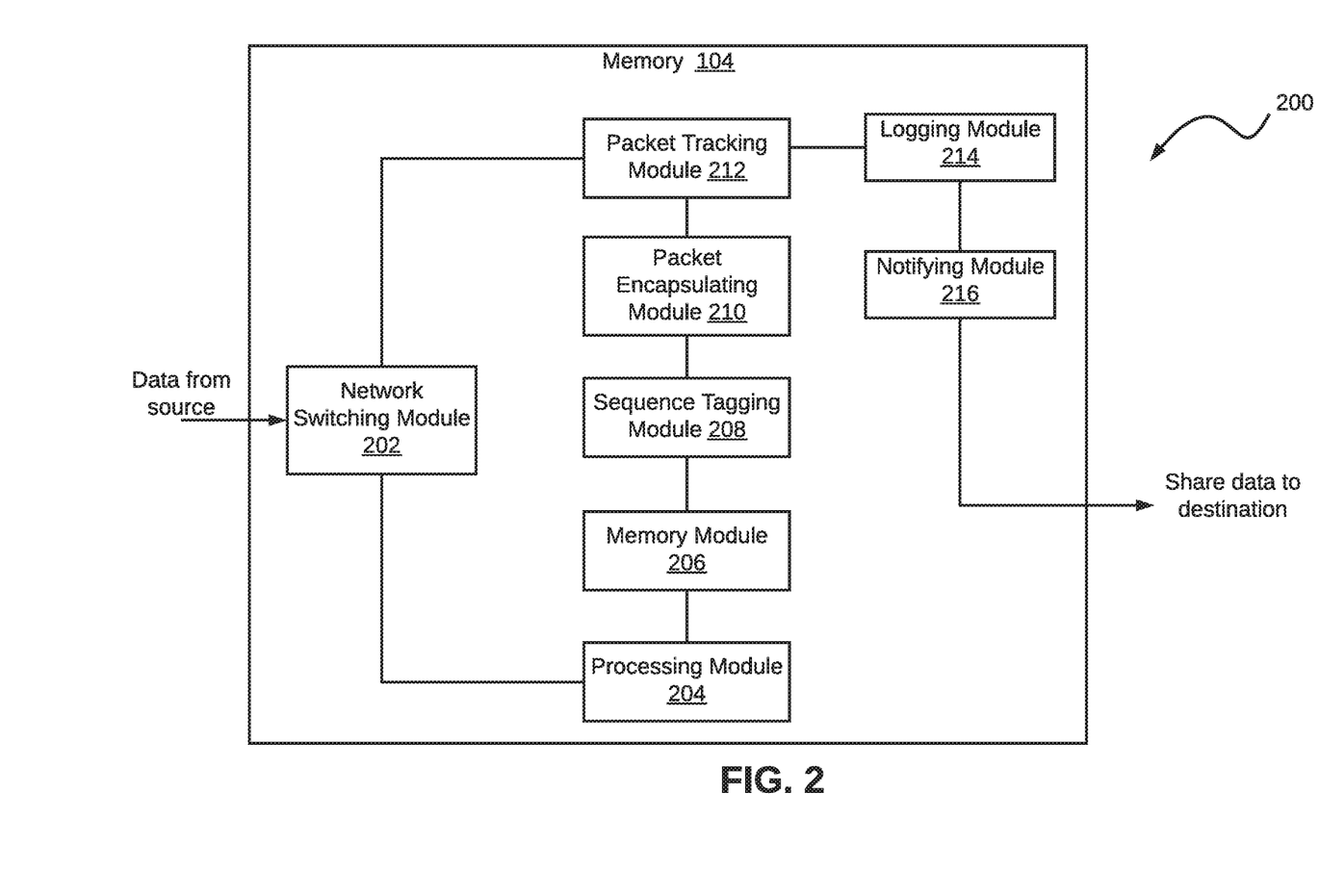
FIG. 2 is a block diagram of various modules within a memory of a data security device configured to secure data transmission in communication networks, in accordance with an embodiment.

Referring now to FIG. 2, a block diagram of various modules within the memory 104 of the data security device 102 configured to secure data transmission in communication networks is illustrated, in accordance with an embodiment. The memory 104 of the data security device 102 may include various modules for performing multiple operations to provide data security, proactively, during transmission of a plurality packets from multiple sources (for example, the plurality of sources 112) to destinations (for example, the plurality of destinations 116). The modules within the memory 104 of the data security device 102 may include a network switching module 202, a processing module 204, a memory module 206, a sequence tagging module 208, a packet encapsulating module 210, a packet tracking module 212, a logging module 214, and a notifying module 216.

The network switching module 202 may be communicatively connected to multiple sources (for example, the plurality of sources 112), the processing module 204, and the packet tracking module 212. The network switching module 202 may further receive a data transmitted by at least one of the sources for triggering. In an embodiment, the network switching module 202 may be a networking hardware such as a switching hub, bridging hub, or an official MAC bridge that may connect with multiple source devices. In this case, the network switching module 202 may be located outside the memory 104.

The network switching module 202 may further use a packet switching operation to receive and forward the data from at least one of the sources to at least one of the destinations (for example, the plurality of destinations 116). The network switching module 202 may be a multiport network bridge that may use MAC addresses to forward the data at a data link layer (layer 2) of an Open System Interconnection (OSI) model. Also, the network switching module 202 may forward the data at a network layer (layer 3) by additionally incorporating a routing functionality. The data may be transmitted to the processing module 204 after the packet switching operation in a form of packets.

The processing module 204 may receive process requests from other modules of the memory 104. With regards to the packets, the processing module 204 executes processes generated for encapsulation of a plurality of packets. Apart from processing of the plurality of packets, various operations such as sequencing of the packets, aligning temporary address to the packets may be performed by the processing module 204. Further, the processing module 204 may employ a kernel residing in house of an Operating System (OS) for the processing. The processing module 204 may be responsible for handling a state of the memory module 206, where the packets may be temporarily stored. In addition, the processing module 204 may be responsible for notifying and logging that may be explained further in conjunction to FIG. 7, based on a packet chain navigation. Thereafter, the processing module 204 transmits processed output results to the memory module 206.

The memory module 206 may receive the processed output results from the processing module 204 to store the same. Further, the memory module 206 receives a request from the sequence tagging module 208. It should be noted that the memory module 206 is an integral part that stores all the packets temporarily. The memory module 206 may use different types of memory sharing mechanisms, such that the packets that are ready to dispatch may be stored temporarily for assigning tracking bits to the packets. This memory module 206 may be allotted to the packets based on some instances of a physical memory. Once the packets are dispatched, instances used by the packets get cleared from the memory module 206. Further, the memory module 206 may be a dynamic memory and may transmit the packets along with network parameters to the sequence tagging module 208.

The sequence tagging module 208 may be configured to receive the packets and the processed outcome results stored in the memory module 206. Further, the sequence tagging module 208 may align the tracking bits to the packets for determining a sequence associated with each of the plurality of packets and other details including different forms and states of the packets. It may be noted that a three-way handshake of Transmission Control Protocol (TCP) may be used by the sequence tagging module 208 to determine the sequence associated with the plurality of packets and to receive an acknowledgement. Further, the sources and destinations may use two sets of numbers as a sequence number and an Acknowledgement (ACK) number, respectively.

In detail, the OS may generate the sequence number for each of the plurality of packets that may be shared with their respective destinations. Based on the sequence number, the destinations may transmit the ACK number back to the sources. In other words, a destination uses the ACK number to acknowledge a source in order to send a payload (i.e., actual data). The sequence tagging module 208 may further be configured to add a SQID to each of the plurality of packets based on the sequence associated with each of the plurality of packets along with the payload. The sequence tagging module 208 may be operatively coupled to the packet encapsulating module 210 to transmit packets tagged with SQID. The sequence tagging module 208 is placed before the encapsulating module 208 of a transport layer security protocol, where a packet framework encrypts the data and the protocol is maintained by the TCP. Further, the sequence tagging module 208 is configured to send the packets tagged with SQID to the packet encapsulating module 210.

The packet encapsulating module 210 may be configured to receive the packets tagged with SQID from the sequence tagging module 208. Further, the packet encapsulating module 210 may group the packets into a single or multiple clusters depending upon at least one of a distance amongst at least one IP attribute associated with destination address of each of the plurality of packets and variance in IP attributes associated with destination address of each of the plurality of packets. This may be performed by generating a pool of packets to be launched by the TCP at the source, post ACK of the sequence generated by the destination. It should be noted that the packet encapsulating module 210 generates the single or multiple clusters of the packets traveling from the source to the destination.

Additionally, the packet encapsulating module 210 transmits an information about the clusters to the packet tracking module 212. It should be noted that encapsulation of the packets to form the clusters may help in identifying a difference and the distance among the associated packets and further to locate deviated packets. Further, the packet encapsulating module 210 may be configured to determine related packets belonging to same patterns. Hence, clustering of the packets also becomes easier to define the packets in a categorical form. A categorical cluster helps in tracking mismatches of the packets during a data transmission. The packet encapsulating module 210 may be further connected to the packet tracking module 212

The packet tracking module 212 is configured to receive the clusters comprising the packets from the packet encapsulating module 210. Here, the packet tracking module 212 may receive a cluster and perform tracking by releasing the packets of the cluster to a respective network destination processed through the network switching module 202. The packet tracking module 212 verifies the distance among the packets of the transmitted categorical cluster in order to identify the deviated packets from the cluster for security purpose. It may be noted that the packet tracking module 212 monitors a transmission process of the packets between the source and destination. Also, the packet tracking module 212 performs distance calculations for each of the plurality of packets based on SQIDs corresponding to the plurality of packets using a machine learning technique or any deep learning technique.

Further, a Euclidean distance technique or any other distance measurement technique may be used by the packet tracking module 212. In an example, when a distance value increases beyond a pre-defined threshold, the associated packets may get destroyed and the respective cluster gets demolished before reaching a particular destination. In other words, when the destination is spoofed, the associated packets get destroyed in order to make communication secure. The cluster may use an IP header (IP HDR) for determining an actual system before sharing payloads. The cluster, during the transmission, to the destination may also use the IP HDR. The packet tracking module 212 further transmits tracing details and events to the logging module 214.

The logging module 214 may receive the tracing details and the events from the packet tracking module 212. Once the packets get released, they may be traced in the logging module 214, that may store navigation details of the packets traversing in the communication network. Further, the logging module 214 may generate a log file that may be examined and validated by the communication network for further analysis. The log file may also be used for determining an incoming and outgoing network traffic pattern. Additionally, the log file may be used to determine vulnerability and different times of attacks. The logging module 214 may collect different hardware defects and issues associated with the source and destination of the communication network. It may be noted that the logging module 214 may be accessed through the kernel using a Secure Shell (SSH) for monitoring purpose. The logging module 214 may be operatively coupled to the notifying module 216.

The notifying module 216 may integrate different error codes with different sets of problem statements. A notification mechanism, used by the notifying module 216, may help in error code initiation for a particular issue that may require to be fixed. Based on an error code wise notification mechanism, hardware failures as well as software failures may be monitored. It may be noted that the notification mechanism helps an end user to perform basic checks such as power issues, connectivity issues, and alerting issues. Further, the notifying module 216 creates a new error code, in case the issues are logged in for a first time.

The data security device 102 uses a cluster-based transmission and the cluster includes an IP datagram header obtained from all similar packets of a categorical cluster, which may help in determining cluster states as well. The data security device 102 ensures elimination of an IP spoofing problem from the communication network and makes the associated packets alert from being spoofed.

Figure 3:
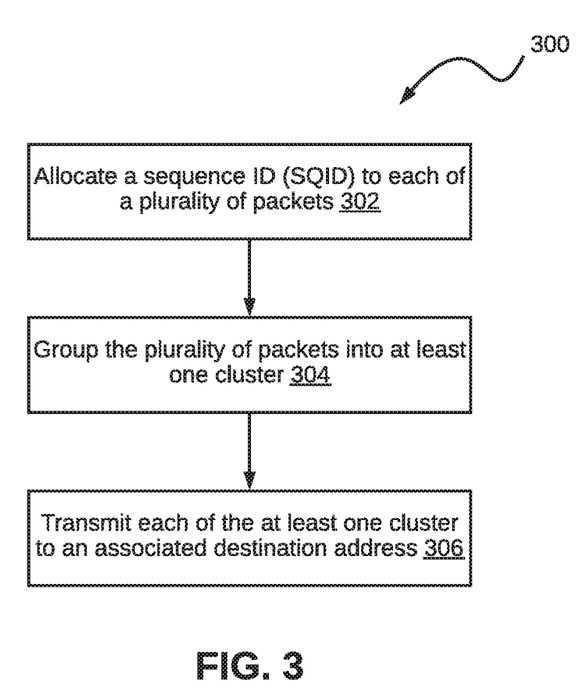
FIG. 3 is a flowchart of a method for securing data transmission in communication network, in accordance with an embodiment.

Referring now to FIG. 3, a flowchart 300 of a method for securing data transmission in communication network is illustrated, in accordance with an embodiment. At step 302, the data security device 102 may allocate an SQID to each of a plurality of packets based on sequence associated with each of the plurality of packets. It may be noted that the SQID is embedded in an IP HDR of an associated packet from the plurality of packets. In some embodiments, the SQID may be used to determine an order of packets based on a hierarchy as well as to maintain the hierarchy during transmission of the packets. The SQID generated by the sequence tagging module 208 of the data security device 102 may be composed of alphanumeric values, or Numeric values. The SQID may be tagged with the IP HDR while loading a payload. The SQID may be generated with six bits in a sequential combination and increment operation. In an embodiment, SQIDs may be assigned to each of the plurality of packets based on a Category ID associated with each of the plurality of packets. This is further explained in detail in conjunction with FIG. 4.

Thereafter, at step 304, the data security device 102 generates at least one cluster by grouping the plurality of packets. It should be noted that a unique cluster ID may be assigned to each of the at least one cluster. The at least one cluster may be generated based on at least one of a distance amongst at least one IP attribute associated with destination address of each of the plurality of packets and variance in IP attributes associated with destination address of each of the plurality of packets. The distance amongst the at least one IP attribute associated with destination address of each of the plurality of packets may be a Euclidean distance. Further, the at least one IP attribute associated with destination address of a packet from the plurality of packets may include an IP address, a class associated with the IP address, a subnet ID, a domain-name, and a unique reference key associated with the domain-name. The subnet ID and the domain-name may be derived from the IP address.

In some embodiments, cluster IDs of the plurality of packets may be determined based on a destination. Further, clusters may be formed for multiple categorical packets as well as destination addresses. This may help to sustain a packet transmission within a destination zone. The clusters may be formed based on a distance technique where the plurality of packets are classified based on the destination and application of a same network layer. Thus, a distance calculation is performed based on a difference in IP headers of the plurality of packets.

By way of an example, consider an IP header 'X' for one packet and for another packet consider the IP header as 'Y'. Now, using a Euclidean distance calculation, the distance between two paths associated with the IP headers 'X' and 'Y' may be determined. Similarly, distances among the IP headers of the plurality of packets may be determined. It may be noted that a major difference among the distances may further form a separate cluster. Whereas, all the packets with minimal distances may be included in a single cluster. Further, the clusters may be assigned to each of the categorical packets, however the packets may be a part of a same cluster for different categories.

At step 306, the data security device 102 transmits each of the at least one cluster to an associated destination address. It should be noted that each cluster in the at least one cluster may include a set of packets from the plurality of packets. Additionally, at least a domain-name is same in destination address associated with each of the set of packets. In some embodiments, the packets of same destination with different class may be grouped together to dispatch from a source (same as source 112a, 112b,112c, and 112n) to a destination (same as destination 116a, 116b, and 116n). This may help in delivering multiple packets of different category IDs at a single instance. Thus, reducing latency of transmission and improving other network parameters.

Figure 4:
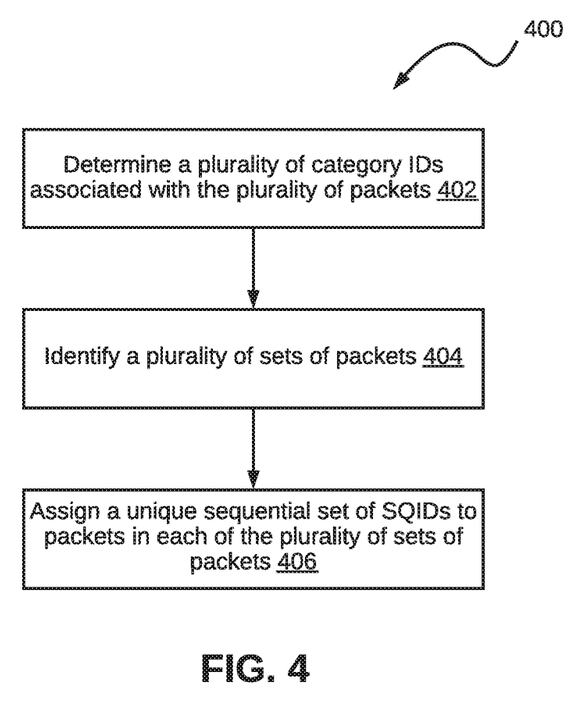
FIG. 4 is a flowchart of a method for allocating Sequence Identifier (SQID) to each of the plurality of packets based on associated category IDs, in accordance with an embodiment.

Referring now to FIG. 4, a flowchart 400 of a method for allocating SQID to each of a plurality of packets based on associated category IDs is illustrated, in accordance with an embodiment. At step 402, a plurality of category IDs associated with the plurality of packets may be determined. It may be noted that a category ID from the plurality of category IDs is assigned to each of the plurality of packets. The category IDs may be assigned based on at least one of an application specific information and an associated IP header. In some embodiments, the plurality of packets may be classified using the category IDs based on their respective source and destination. The category ID for each of the plurality of packets may be determined based on communication protocols as well as different frames. It may be noted that there may be different types of frames, followed by different sets of protocols of a network. Further, the category IDs may be assigned based on an end IP header information. It may be noted that the source and destination should be same for every class and the packets that need to be travelled require same set of associativity.

At step 404, a plurality of sets of packets may be identified. Each set in the plurality of sets may include packets that have the same category ID. At step 406, a unique sequential set of SQIDs may be assigned to packets in each of the plurality of sets of packets. In some embodiments, the unique sequential set of SQIDs is assigned based on a First In, First Out (FIFO) technique. By way of an example, if there are three such sets of packets, in each set, SQIDs may start from '1' based on FIFO technique. The detailed explanation for assigning the SQIDs to each of the plurality of packets by the sequence tagging module 208 has been provided in conjunction to FIG. 2.

Figure 5:
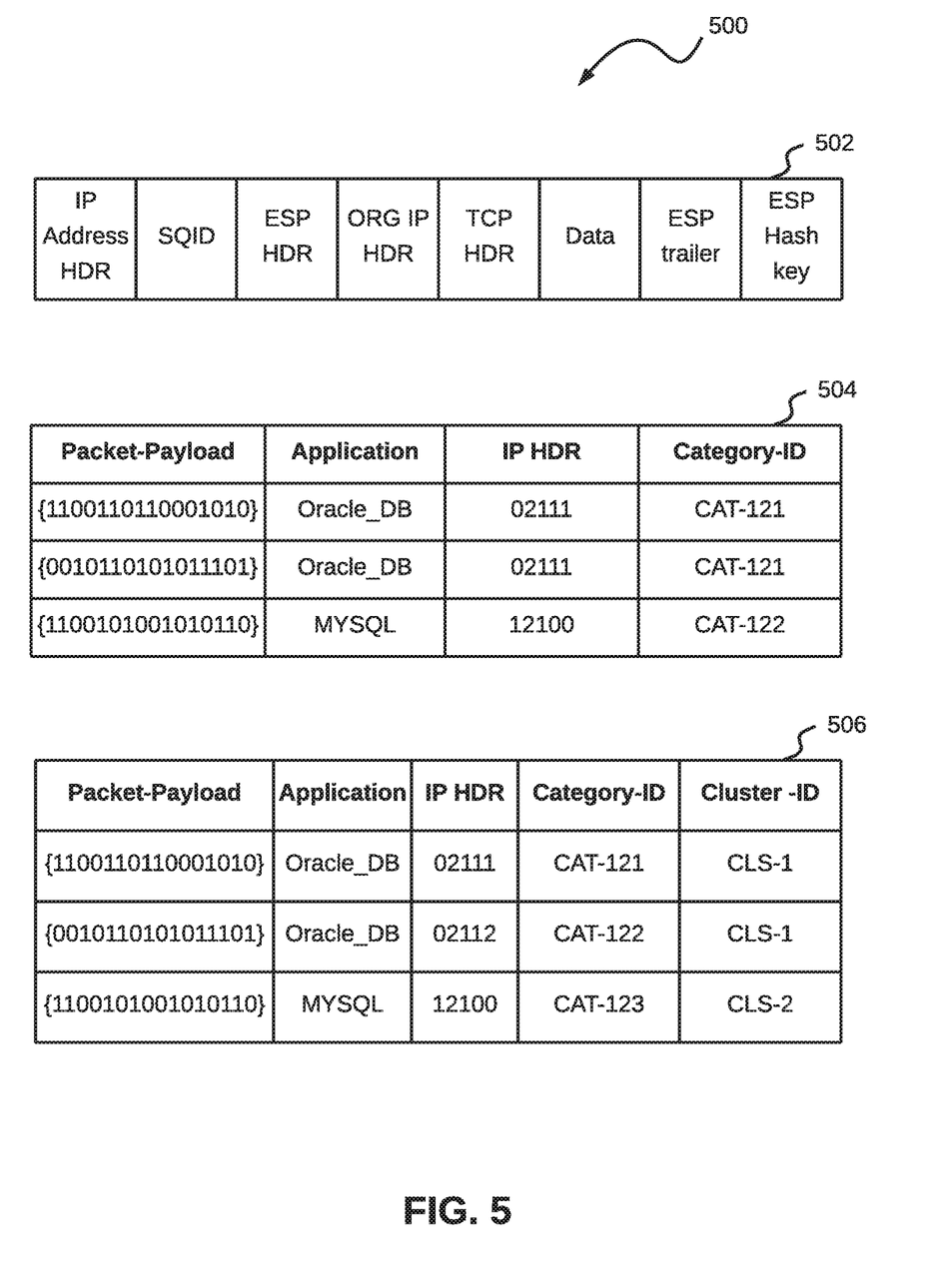
FIG. 5 illustrates exemplary tables representing SQIDs, category IDs, cluster IDs assigned to various packets, in accordance with an exemplary embodiment.

Referring now to FIG. 5, exemplary tables representing SQIDs, category IDs, cluster IDs assigned to various packet are illustrated, in accordance with an exemplary embodiment. A table 502 represents a packet header and may include eight columns and one row as depicted in FIG. 5. The packet header may include an IP HDR address, an SQID, an Encapsulating Security Payload (ESP) HDR, an ORG IP HDR, a TCP HDR, a data, an ESP trailer, and an ESP hash key. It may be noted that the packet header as depicted by the table 502 may be generated for each of a plurality of packets. Further, a table 504 in FIG. 5 depicts allocation category IDs to packets. A first column of the table 504 may represent a first packet payload (1100110110001010), a second packet payload (0010110101011101), and a third packet payload (1100101001010110). A second column of the table 504 may include details of an application associated with the first, the second and the third payload. Further, a third and a fourth column of the table 504 represents IP header and category ID, respectively. The application, IP header and category ID corresponding to the first packet payed are Oracle_DB, 02111, CAT-121. Similarly, for the second and third packet payloads, the application, IP header and category ID are Oracle_DB, 02111, CAT-121, and MYSQL, 21200, CAT-122, respectively.

It has been discussed earlier that the cluster ID is assigned after assigning the SQID and category ID to each of the plurality of packets. Allocation of cluster IDs is depicted by a table 506 that includes an additional column of cluster ID, when compared to the table 504. The cluster IDs corresponding to the first, second, and third packet payload are CLS-1, CLS-1, and CLS-2, respectively as shown in the table 506. It is clear from the table 506 that two different packet payloads of different category IDs may be assigned with a same cluster ID. For example, the first packet payload and second packet payload include two different category IDs, i.e., CAT-121 and CAT-122, however they belong to the same cluster and include the same cluster ID, i.e., CLS-1.

Figure 6:
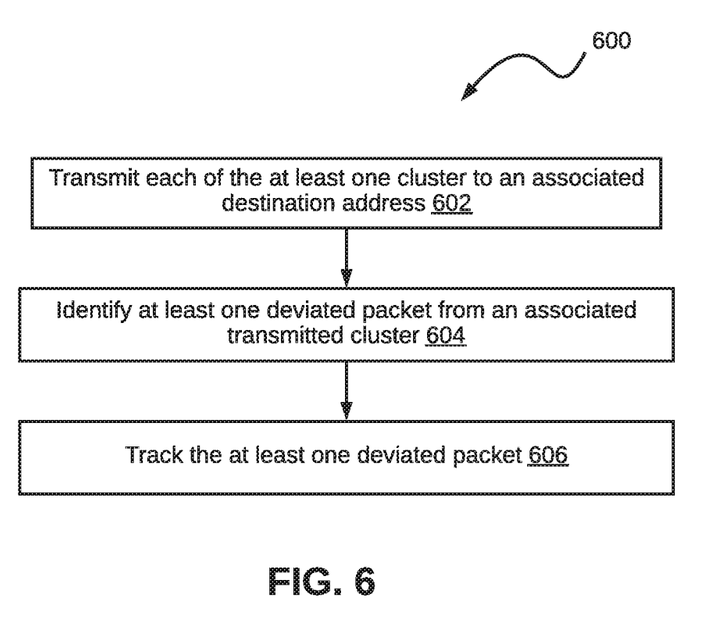
FIG. 6 illustrates a flowchart of a method for tracking deviated packets during data transmission, in accordance with an embodiment.

Referring now to FIG. 6, a flowchart 600 of a method for tracking deviated packets during data transmission is illustrated, in accordance with an embodiment. At step 602, each of at least one cluster may be transmitted to an associated destination address. Each cluster in the at least one cluster includes a set of packets from the plurality of packets. It may be noted that at least a domain-name is same in destination address associated with each of the set of packets. At step 604, at least one deviated packet from an associated transmitted cluster may be identified. The identification may be performed based on at least one IP attribute of each of the at least one deviated packet from IP attributes of remaining packets in the associated transmitted cluster, or change in transmission speed of each of the at least one deviated packet when compared to remaining packets in the associated transmitted cluster. A TCP IP protocol may handshake with the at least one deviated packet. In case the TCP IP protocol is blocked with firewall, then it may be assumed as a lost packet.

At step 606, the at least one deviated packet may be tracked based on at least one of the associated change in the distance of the at least one IP attribute and change in the associated transmission speed. In some embodiments, post transmitting the cluster of packets to the destination, the distance among the packets, may also be traced. This may help in identifying the deviated packet or any other issue regarding packet loss in the communication networks. It should be noted that the distance may be measured by using the Euclidean distance calculation as per a formula, given below in equation 1:

$$\text{Euclidean distance} = \text{sqrt}((q1-p1)2+(q2-p2)2) \qquad (1)$$

Based on the distance among the plurality of packets, the data security device 102 may understand the vulnerability associated with the plurality of packets. Thus, it may be important to track the distance among the plurality of packets belonging to the same cluster. As the distance associated with any packet of the cluster changes, the chances of packet loss for that packet may increase.

Figure 7:
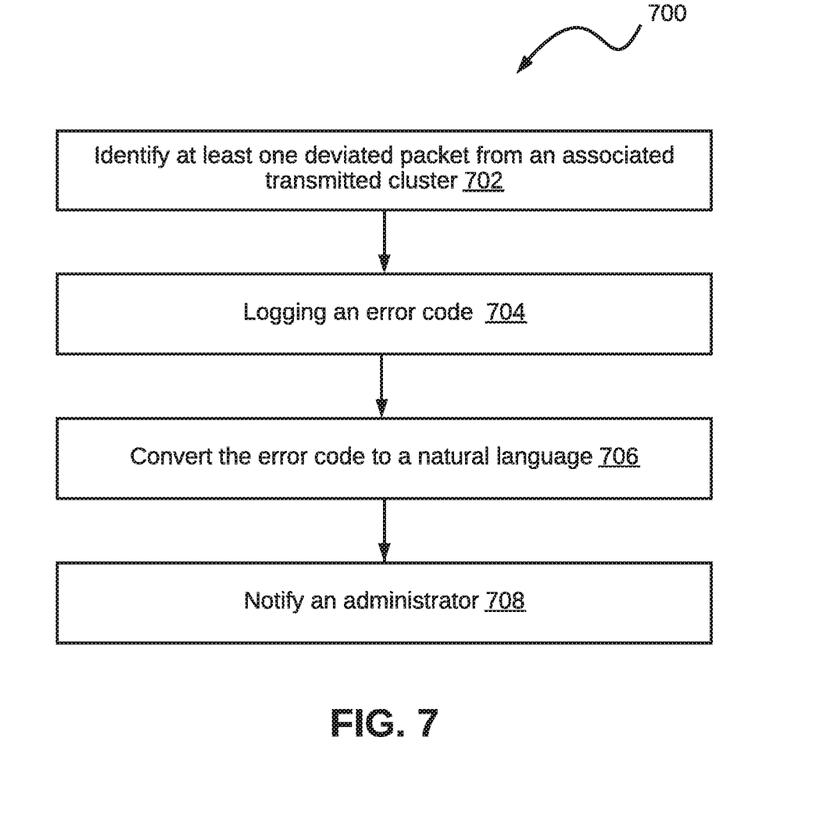
FIG. 7 illustrates a flowchart of a method for logging an error code upon identification of a deviated packet, in accordance with an embodiment.

Referring now to FIG. 7, a flowchart 700 of a method for logging an error code upon identification of a deviated packet is illustrated, in accordance with an embodiment. At step 702, at least one deviated packet may be identified from an associated transmitted cluster, based on at least one of a cluster ID of each of the at least one deviated packet, change in a distance of at least one IP attribute of each of the at least one deviated packet from IP attributes of remaining packets in the associated transmitted cluster, or change in transmission speed of each of the at least one deviated packet when compared to remaining packets in the associated transmitted cluster.

At step 704, an error code may be logged in response to identifying each of the at least one deviated packet. It may be noted that the error code for a deviated packet may include details associated with the deviated packet. The details may include at least one of an SQID of the deviated packet, destination address in the deviated packet, and an error ID. The details may also be TCP IP handshake details, and multiconnection packet details. At step 706, the error code may be converted into a natural language. The error code generation may be established by employing connection protocols such as, but not limited to, a Serial Advanced Technology Attachment (SATA), an Integrated Drive Electronics (IDE), an IEEE-1394, a Universal Serial Bus (USB), an API connect or communication between API's, a fiber channel, a Small Computer Systems Interface (SCSI), a STD Bus, an RS-232, an RS-422, an RS-485, an I2C, a Serial Peripheral Interface (SPI), a Microwire, a 1-Wire, an IEEE 1284, an Intel QuickPath Interconnect, an InfiniBand, and a Peripheral Component Interconnect Express (PCIe), using standard data connections means such as wireless or wired.

In some embodiments, when the distance exceeds beyond a threshold, in such case the error code may be generated. The error code may further be used for determining states of the deviated packets. Also, the error code may be used to detect the distance where the deviated packets are currently running through. Once the packets are deviated or lost, a final distance from an actual destination may be detected and subsequently the error code may be generated. The error code may help to provide the details of the deviated packets, and using these details, the administrator may figure out the actual destination where the deviated packets reside.

At step 708, a notification may be sent to an administrator based on the natural language corresponding to the error code. In some embodiments, a notification mechanism for generating the notification may be used that may help in initiating the error code for a particular issue that needs to be fixed by engineers. Hardware failure as well as software failures may be monitored based on an error code wise notification mechanism.

Figure 8:
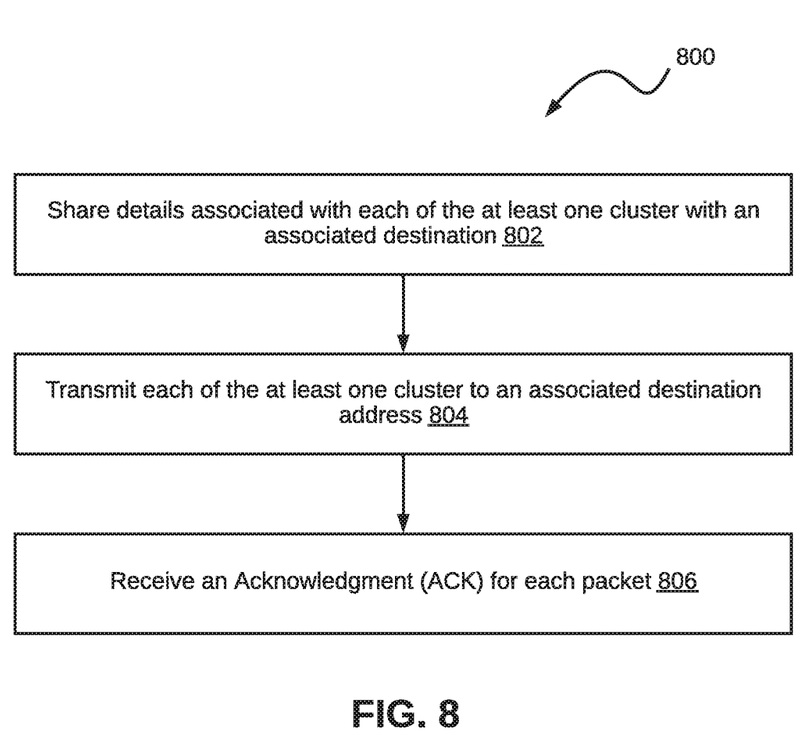
FIG. 8 illustrates a flowchart of a method for receiving an Acknowledgement (ACK) for each of a plurality of packets in each of at least one cluster, in accordance with an embodiment.

Referring now to FIG. 8, a flowchart 800 of a method for receiving an ACK for each of a plurality of packets in each of at least one cluster is illustrated, in accordance with an embodiment. At step 802, details associated with each of the at least one cluster may be shared with an associated destination. The details associated with a cluster may include an SQID of each packet in the cluster and destination address for each packet in the cluster. At step 804, each of the at least one cluster may be transmitted to associated destination address. It may be noted that each cluster in the at least one cluster includes a set of packets from the plurality of packets and at least a domain-name is same in destination address associated with each of the set of packets. At step 806, an ACK may be received for each packet in each of the at least one cluster.

The disclosed method and system may be supported by multiple applications, wherein the system and method may be applicable for network devices as well the switches, and hubs. The switches may use the present system and method for transmitting multiple packets at a single instance. This may help in reducing a time of execution and improving the service accordingly. Hence, latency in packet transmission may be reduced.

Additionally, the disclosed method and system may provide a solution for data hacking or other issues such as hardware or software failure and thereby helps in reducing overall security issues, while transmitting a data. The proposed system and method focus on tracking a distance between packets during transmission of the packets from a source to a destination. Thereby, helps in lessening the overall security issues by creating a chain of the packets, that may analyze every packet and associated distance. Further, the system may generate an alert or an error code for tracing vulnerability of network domain in order to enhance security during data transmission.

The disclosed method and system may be used in cloud projects as well as in integration projects to develop a data center infrastructure along with an application infrastructure. Moreover, the system may also be integrated to an application-based software and cybersecurity projects, where a packet chain transmission method may provide huge benefits to detect untrusted network sources.

Figure 9:
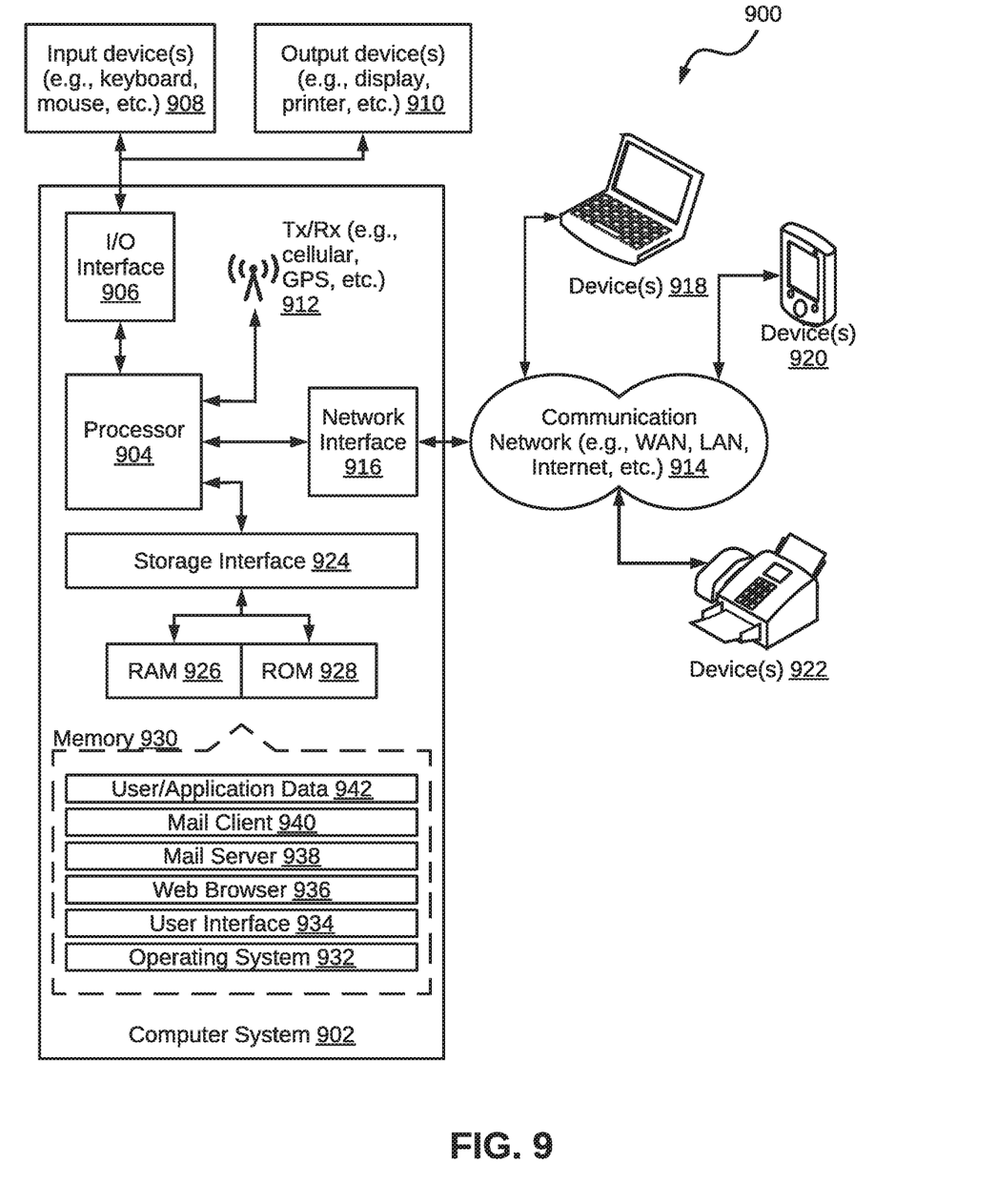
FIG. 9 illustrates a block diagram of an exemplary computer system for implementing embodiments consistent with the present disclosure.

Referring now to FIG. 9, a block diagram of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

In some embodiments, the techniques may employ a chain-based grouping and monitor data transmission irrespective of a source and a destination proactively rather than reactively without departing from the spirit and scope of the disclosed embodiments. Unlike conventional systems, the present system improves efficiency, security, packet transmission speed as well as performance of the network. Further, the techniques described above may be employed in any kind of deep neural network (DNN) such as recurrent neural network (RNN), convolutional neural network (CNN), or the like. Moreover, the techniques may be easily deployed in any cloud-based servers for access and use as an 'application as a service' by any computing device including mobile device. For example, the data security device 102 may be implemented on a cloud-based server and used for securing data transmission in communication networks.

The specification has described method and system for securing data transmission in communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for securing data transmission in communication networks, the method comprising: allocating, by a data security device, a sequence ID (SAID) to each of a plurality of packets based on sequence associated with each of the plurality of packets, wherein the SAID is embedded in an Internet Protocol (IP) header of an associated packet from the plurality of packets; grouping, by the data security device, the plurality of packets into at least one cluster based on at least one of: a distance amongst at least one IP attribute associated with destination address of each of the plurality of packets; and variance in IP attributes associated with destination address of each of the plurality of packets; and transmitting, by the data security device, each of the at least one cluster to an associated destination address, wherein each cluster in the at least one cluster comprises a set of packets from the plurality of packets, and wherein at least a domain-name is same in destination address associated with each of the set of packets;
wherein the at least one IP attribute associated with destination address of a packet from the plurality of packets comprises an IP address, a class associated with the IP address, a subnet ID, and a domain-name, wherein the subnet ID and the domain-name are derived from the IP address.

2. The method of claim 1, wherein allocating the SAID to each of the plurality of packets comprises: determining a plurality of category IDs associated with the plurality of packets, wherein a category ID from the plurality of category IDs is assigned to each of the plurality of packets based on at least one of an application specific information and an associated IP header; identifying a plurality of sets of packets, wherein each set in the plurality of sets comprises packets having the same category ID; and assigning a unique sequential set of SQIDs to packets in each of the plurality of sets of packets, wherein the unique sequential set of SQIDs is assigned based on a First In, First Out (FIFO) technique.

3. The method of claim 1, wherein the distance amongst the at least one IP attribute associated with destination address of each of the plurality of packets is a Euclidean distance.

4. The method of claim 1 further comprising assigning a unique cluster ID to each of the at least one cluster.

5. The method of claim 4, further comprising identifying at least one deviated packet from an associated transmitted cluster, based on at least one of a cluster ID of each of the at least one deviated packet, change in a distance of at least one IP attribute of each of the at least one deviated packet from IP attributes of remaining packets in the associated transmitted cluster, or change in transmission speed of each of the at least one deviated packet when compared to remaining packets in the associated transmitted cluster.

6. The method of claim 5, further comprises tracking the at least one deviated packet, based on at least one of the associated change in the distance of the at least one IP attribute and change in the associated transmission speed.

7. The method of claim 5, further comprises logging an error code in response to identifying each of the at least one deviated packet, wherein the error code for a deviated packet comprises details associated with the deviated packet, and wherein details comprise at least one of a SQID of the deviated packet, destination address in the deviated packet, and an error ID.

8. The method of claim 7, further comprising: converting the error code to a natural language; and notifying an administrator based on the natural language corresponding to the error code.

9. The method of claim 1, further comprising: sharing details associated with each of the at least one cluster with an associated destination, wherein the details associated with a cluster comprises a SQID of each packet in the cluster and destination address for each packet in the cluster; and receiving an Acknowledgement (ACK) for each packet in each of the at least one cluster.

10. A system for securing data transmission in communication networks, the system comprising: a processor; and a memory communicatively coupled to the processor, wherein the memory stores processor instructions, which, on execution, causes the processor to: allocate a sequence ID (SAID) to each of a plurality of packets based on sequence associated with each of the plurality of packets, wherein the SAID is embedded in an Internet Protocol (IP) header of an associated packet from the plurality of packets; group the plurality of packets into at least one duster based on at least one of: a distance amongst at least one IP attribute associated with destination address of each of the plurality of packets; and variance in IP attributes associated with destination address of each of the plurality of packets; and transmit each of the at least one duster to an associated destination address, wherein each duster in the at least one duster comprises a set of packets from the plurality of packets, and wherein at least a domain-name is same in destination address associated with each of the set of packets;
wherein the at least one IP attribute associated with destination address of a packet from the plurality of packets comprises an IP address, a class associated with the IP address, a subnet ID, and a domain-name, wherein the subnet ID and the domain-name are derived from the IP address.

11. The system of claim 10, wherein the processor instructions further cause the processor to: determine a plurality of category IDs associated with the plurality of packets, wherein a category ID from the plurality of category IDs is assigned to each of the plurality of packets based on at least one of an application specific information and an associated IP header; identify a plurality of sets of packets, wherein each set in the plurality of sets comprises packets having the same category ID; and assign a unique sequential set of SQIDs to packets in each of the plurality of sets of packets, wherein the unique sequential set of SQIDs is assigned based on a First In First Out (FIFO) technique.

12. The system of claim 10, wherein the distance amongst the at least one IP attribute associated with destination address of each of the plurality of packets is a Euclidean distance.

13. The system of claim 10, wherein the processor instructions further cause the processor to assign a unique cluster ID to each of the at least one cluster.

14. The system of claim 13, wherein the processor instructions further cause the processor to identify at least one deviated packet from an associated transmitted cluster, based on at least one of a cluster ID of each of the at least one deviated packet, change in a distance of at least one IP attribute of each of the at least one deviated packet from IP attributes of remaining packets in the associated transmitted duster, or change in transmission speed of each of the at least one deviated packet when compared to remaining packets in the associated transmitted duster.

15. The system of claim 14, wherein the processor instructions further cause the processor to track the at least one deviated packet, based on at least one of the associated change in the distance of the at least one IP attribute and change in the associated transmission speed.

16. The system of claim 14, wherein the processor instructions further cause the processor to log an error code in response to identifying each of the at least one deviated packet, wherein the error code for a deviated packet comprises details associated with the deviated packet, and wherein details comprise at least one of a SQID of the deviated packet, destination address in the deviated packet, and an error ID.

17. The method of claim 16, wherein the processor instructions further cause the processor to: convert the error code to a natural language; and notify an administrator based on the natural language corresponding to the error code.

18. The system of claim 10, wherein the processor instructions further cause the processor to; share details associated with each of the at least one duster with an associated destination, wherein the details associated with a cluster comprises a SQID of each packet in the cluster and destination address for each packet in the cluster; and
receive an Acknowledgement (ACK) for each packet in each of the at least one cluster.

19. A non-transitory computer-readable medium for securing data transmission in communication networks, having stored thereon, a set of computer-executable instructions causing a computer comprising one or more processors to perform steps comprising: allocating a sequence ID (SAID) to each of a plurality of packets based on sequence associated with each of the plurality of packets, wherein the SAID is embedded in an Internet Protocol (IP) header of an associated packet from the plurality of packets; grouping the plurality of packets into at least one cluster based on at least one of: a distance amongst at least one IP attribute associated with destination address of each of the plurality of packets; and variance in IP attributes associated with destination address of each of the plurality of packets; and transmitting each of the at least one cluster to an associated destination address, wherein each cluster in the at least one cluster comprises a set of packets from the plurality of packets, and wherein at least a domain-name is same in destination address associated with each of the set of packets;
wherein the at least one IP attribute associated with destination address of a packet from the plurality of packets comprises an IP address, a class associated with the IP address, a subnet ID, and a domain-name, wherein the subnet ID and the domain-name are derived from the IP address.

* * * * *